(12) United States Patent
Chen et al.

(10) Patent No.: US 8,000,285 B2
(45) Date of Patent: Aug. 16, 2011

(54) REVERSE LINK OVERLOAD POWER GAIN CONTROL

(75) Inventors: Pi-Chun Chen, Lake Hiawatha, NJ (US); Qinqing Zhang, Morganville, NJ (US)

(73) Assignee: Alcatel Lucent, Paris (FR)

( * ) Notice: Subject to any disclaimer, the term of this patent is extended or adjusted under 35 U.S.C. 154(b) by 1448 days.

(21) Appl. No.: 11/476,840

(22) Filed: Jun. 29, 2006

(65) Prior Publication Data

US 2008/0002602 A1    Jan. 3, 2008

(51) Int. Cl.
*H04W 4/00* (2009.01)

(52) U.S. Cl. ........ 370/318; 370/329; 370/335; 370/342; 370/542; 455/69; 455/453; 375/130; 713/320

(58) Field of Classification Search .................. 370/329, 370/370; 455/453; 713/320
See application file for complete search history.

(56) References Cited

U.S. PATENT DOCUMENTS

| 5,781,783 A * | 7/1998 | Gunther et al. ............... 713/320 |
| 5,991,285 A * | 11/1999 | Ghosh ........................... 370/335 |
| 2007/0015476 A1 * | 1/2007 | Akbar Attar et al. ...... 455/127.1 |

\* cited by examiner

*Primary Examiner* — Pierre-Louis Desir
(74) *Attorney, Agent, or Firm* — Harness, Dickey & Pierce

(57) ABSTRACT

In one embodiment, a reverse link overhead channel power gain for an access terminal is determined based on the service activity of the access terminal. In association therewith, or independent thereof, the reverse link overhead channel power gain may be dynamically adjusted based on the services activated and/or deactivated. The dynamic adjustment may also take into account the load on the system.

16 Claims, 4 Drawing Sheets

REVERSE LINK OVERLOAD POWER GAIN CONTROL

BACKGROUND OF THE INVENTION

In wireless communication systems, the communication needs of an access terminal are handled by an access network providing communication services for access terminals in a geographic area associated with the access network. The access terminal may also be referred to as a mobile station, user equipment, etc., and may be a wireless phone, wireless equipped computer, wireless equipped PDA, etc. Communication from the access network to the access terminal is referred to as forward or downlink communication. Communication from the access terminal to the access network is referred to as reverse or up link communication.

In code division multiple access (CDMA) communication systems, in addition to bearer traffic channels there are overhead channels that carry information used to facilitate use of the traffic channels. For example, in cdma2000 1x-EV-DO, there are five reverse link overhead channels: a pilot channel (PICH), a data rate control (DRC) channel, a data source control (DSC) channel, a reverse rate indication (RRI) channel, and an acknowledgement channel (ACK). The PICH provides channel estimation on the reverse link, and allows coherent demodulation of reverse link traffic channels. The DRC channel provides feedback from an access terminal regarding the forward link channel for use in management of forward link scheduling. For example, the DSC channel provides feedback for fast serving sector switching on the forward link. The RRI channel indicates the reverse link traffic channel data rate to expedite the decoding process. The ACK channel provides feedback to support forward link hybrid automatic retransmission requests (HARQ).

Because of this channel structure, the performance of forward link traffic channels is coupled with the performance of reverse link overhead channels. In other words, the accuracy and speed of the reverse link overhead channel feedback will influence the sector throughput on the forward link. Accordingly, it may be desirable to improve the speed and accuracy of the reverse link overhead channel feedback. Using the DRC channel as an example, a larger DRC channel power gain can often result in a faster and more accurate feedback, and may result in an improvement in the forward link capacity. By contrast, a smaller DRC channel gain produces a slower, less accurate feedback, and results in less forward link capacity. However, the tradeoff in having better reverse link overhead channel feedback is that more resource tends to be consumed.

For some symmetric, real-time, low data rate services such as Voice-Over-Internet-Protocol (VoIP), the overall system capacity may be reverse link limited rather than forward link limited. In these situations, improving the forward link capacity by increasing the reverse link overhead channel power gain does not improve the overall system capacity because it is the reverse link capacity that creates the bottleneck.

SUMMARY OF THE INVENTION

The present invention provides a methodology to determine a reverse link overhead channel power gain for an access terminal based on the service activity of the access terminal.

In association therewith, or independent thereof, the present invention also provides a methodology to dynamically adjust reverse link overhead channel power gain based on the services activated and/or deactivated. For services where the reverse link capacity provides a greater improvement in overall system capacity such as symmetric, real-time, low rate data services, one embodiment of the method lowers the reverse link overhead feedback channel power gain. This results in some minor performance degradation on the forward link, but provides a greater benefit in the form of a larger reverse link capacity.

Furthermore, in one embodiment, the methodologies are constrained based on whether or not the system is loaded. For example, if the system is loaded, then the method may not reduce the reverse link overhead feedback channel power gain.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein.

DETAILED DESCRIPTION OF EXAMPLE EMBODIMENTS

An access network (AN) handles the communication needs of access terminals (ATs) in the access network's geographic area. An access terminal may be a wireless phone, wireless equipped PDA, wireless equipped computer, etc., and is often referred to as a mobile station, user equipment, etc. The access network communicates wirelessly with the access terminal, and provides connectivity to other access networks, packet data networks, etc.

Typically, an access terminal may run several different applications, each requiring a different service from the access network. Example services may include low data rate services such as Voice-over-Internet-Protocol (VoIP) and higher data rate services such as internet browsing, video streaming, etc. Each service that is activated between an access terminal and an access network requires a configuration. A service activation may be initiated either by the access terminal or by the access network. For example, if the access terminal decides to browse the internet, then the associated service will be activated by the access terminal. If someone desires to place a VoIP call to the access terminal, then the service will be initiated by the access network.

Figure 1:
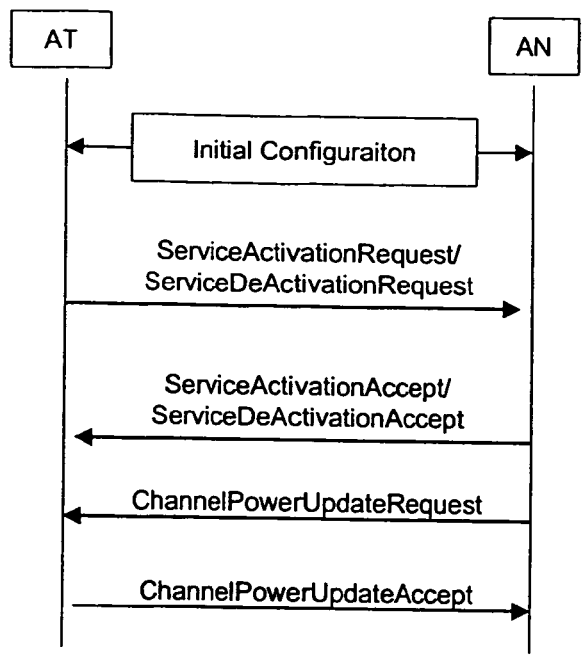
FIG. 1 illustrates the call flow for system configuration when initiated by an access terminal.

FIG. 1 illustrates the call flow for a service configuration if initiated by an access terminal. As shown, an initial configuration takes place between the access terminal and the access network, during which time the power gain for the reverse link and forward link channels is established. Establishing the power gain for the reverse link overhead channels during this initial configuration may be performed according to a method for establishing overhead channel power gain on the reverse link, an embodiment of which is described in detail below with respect to FIG. 3. As shown in FIG. 1, the initial configuration, the access terminal sends a service activation request to the access network. If the service activation is accepted by the access network, then the access network sends a service activation acceptance. The process of service activation is well known in the art and will not be described in detail.

Figure 4:
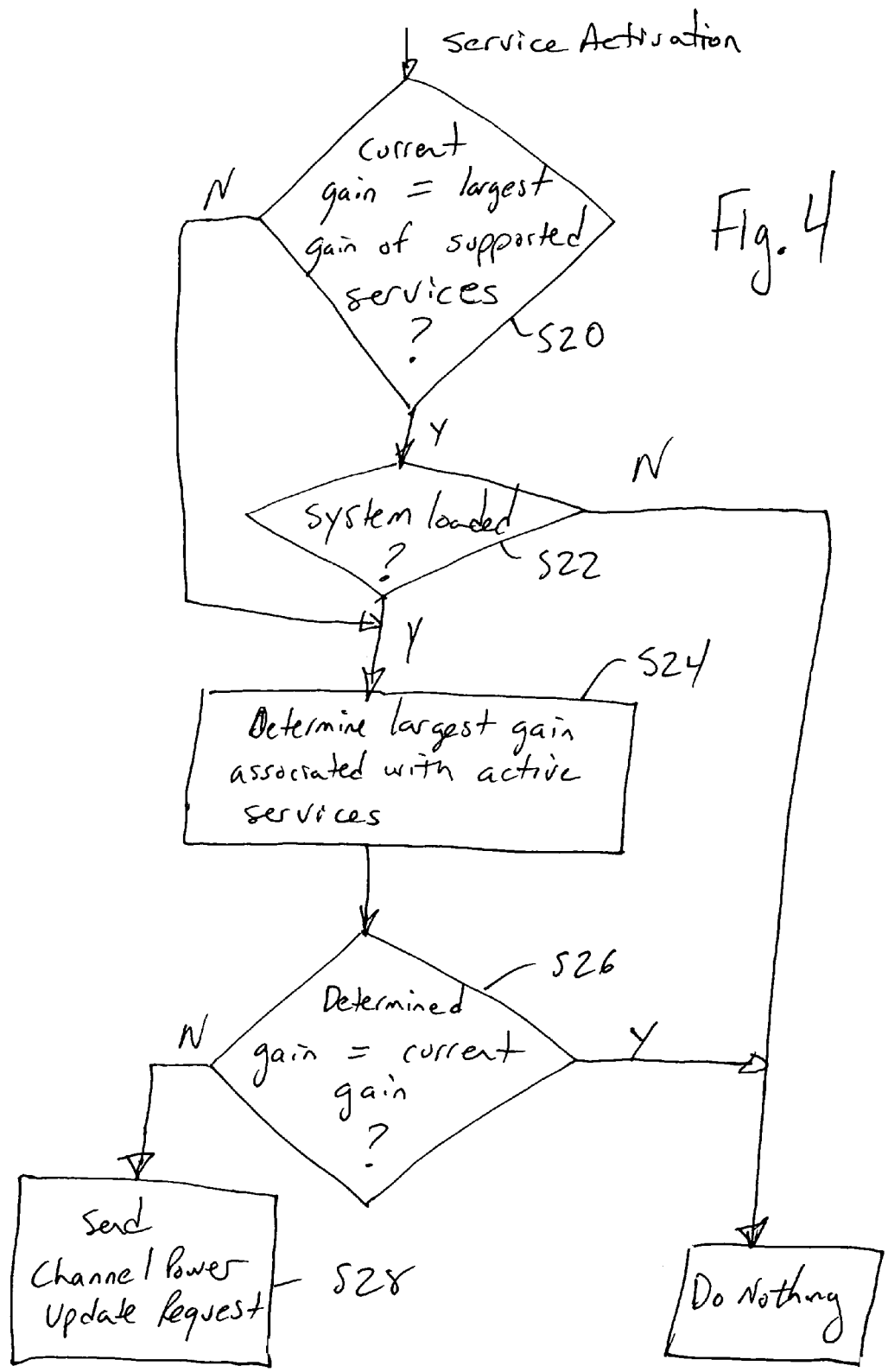
FIG. 4 illustrates a method of adapting a reverse link overhead channel power gain in response to a service activation according to an embodiment of the present invention.

Assuming an acceptable service activation, the access network performs a method of adapting the overhead channel power gain on the reverse link according to an embodiment of the present invention such as shown in FIG. 4. Based on the results of this method, the access network may send a channel power update request to the access terminal. The channel power update request may request that the access terminal change or modify the overhead channel power gain used for reverse link transmissions. If accepted by the access terminal, the access terminal sends a channel power update acceptance back to the access network.

FIG. 1 also shows that the same process occurs when a service is deactivated by the access terminal. However, assuming a service deactivation is accepted, then a different method of reverse link overhead channel power adaptation will be performed, an embodiment of which is described below with respect to FIG. 5.

Figure 2:
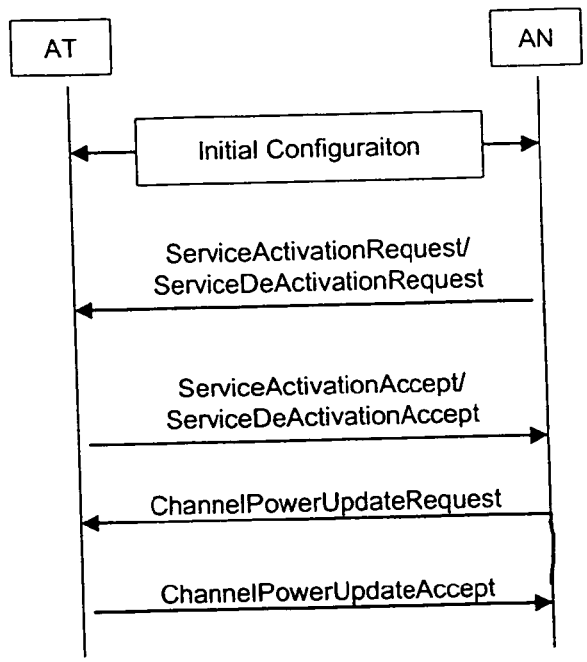
FIG. 2 illustrates a call flow for system configuration when initiated by an access network.

FIG. 2 illustrates the call flow of a system configuration if the service activation request or deactivation request is initiated by the access network. As shown in FIG. 2, the same initial configuration takes place between the access terminal and the access network as described above with respect to FIG. 1. Namely, the method of establishing the default overhead channel power gain on the reverse link may be performed according to the method described in detail below with respect to FIG. 3. Subsequently, the access network issues a service activation request to the access terminal. That activation request may be accepted by the access terminal, in which case the access terminal sends a service activation acceptance to the access network. As mentioned above, this service activation request and acceptance process is well known and will be described in detail for the sake of brevity.

Assuming an acceptable service activation has taken place, then the access network performs the method of adapting the overhead channel power gain such as described in detail below with respect to FIG. 4. If that method results in a change or modification of the overhead channel power gain for the reverse link, then the access network sends a channel power update request to the access terminal so that the access terminal will change or modify the overhead channel power gain used in transmissions. If this is acceptable to the access terminal, the access terminal sends a channel power update acceptance to the access network.

Figure 5:
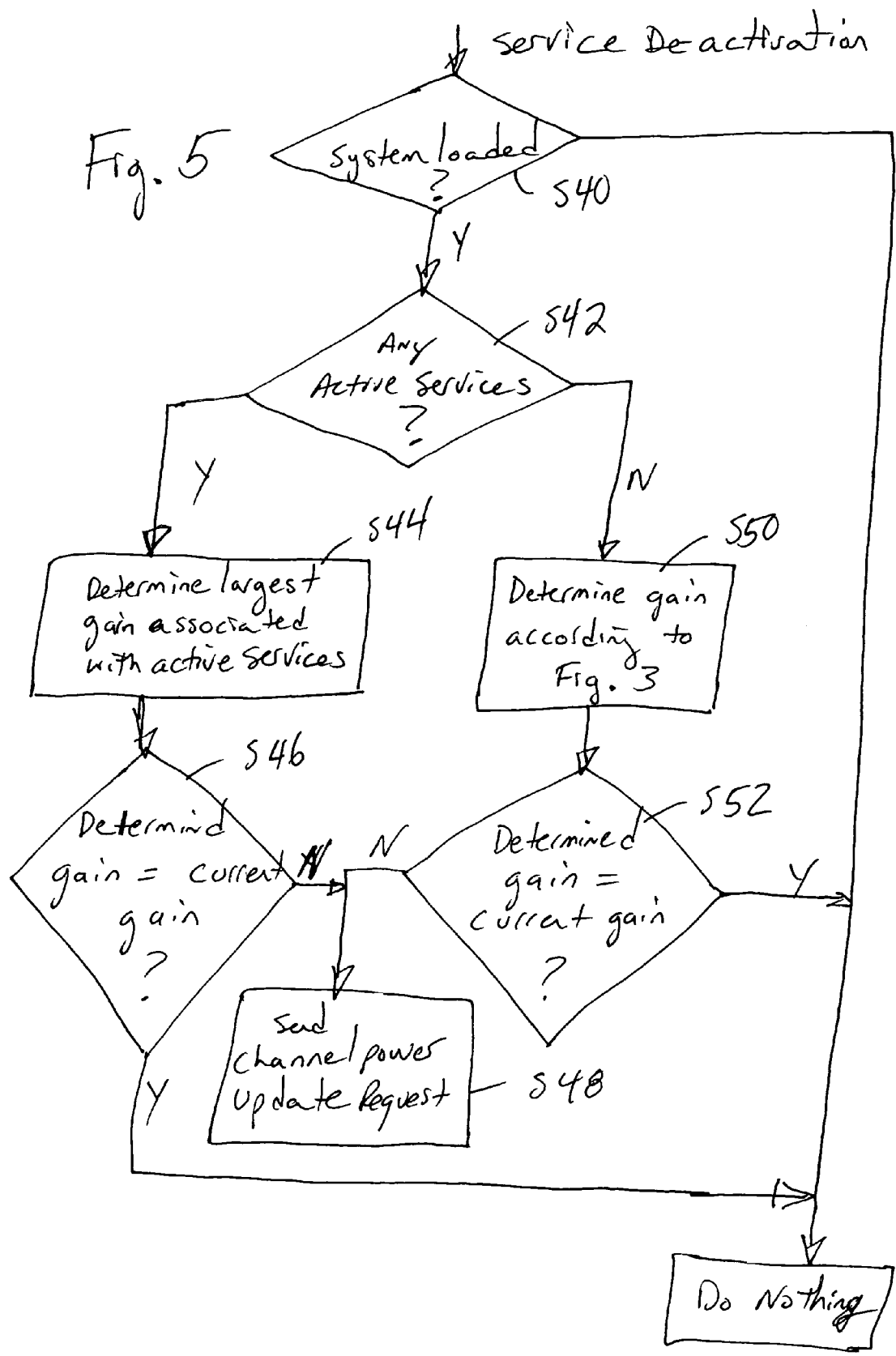
FIG. 5 illustrates a method of adapting a reverse link overhead channel power gain in response to a service deactivation according to an embodiment of the present invention.

As with the call flow described above with respect to FIG. 1, the call flow of FIG. 2 is also applicable with respect to service deactivation requests initiated by the access network. However, instead of performing the overhead channel power adaptation methodology described in detail below with respect to FIG. 4, the overhead channel adaptation methodology described in detail below with respect to FIG. 5 is performed.

Next, an embodiment of establishing a default overhead channel power gain on the reverse link such as during the initial configuration illustrated in FIGS. 1 and 2 will be described with respect to the flowchart illustrated in FIG. 3. As shown, in step S10, the access network receives the service capabilities of the access terminal during the initial configuration. The service capabilities indicate the types of services that the access terminal may take advantage of (e.g., VoIP, streaming video, internet browsing, etc.). Next, in step S12, the access network determines if the access terminal's service activity history is available. For each access terminal, the access network keeps a tally of the number of times the access terminal initiates each service of which the access terminal is capable.

If the access network does not have a service activity history for the access terminal, then processing proceeds from step S12 to step S14. In step S14, the access network sets the reverse link overhead channel gains to the maximum gain associated with the services of which the access terminal is capable. Table 1 below illustrates possible service categories for an example access terminal.

TABLE 1

| Service Category | Profile ID | Description | DRC Channel Power Gain |
|---|---|---|---|
| Conversational Speech | 0x0100 | Conversational Rate Set 1 Speech | DRCGain_0x0100 |
| Conversational Video | 0x0300 | Conversational Video 32K | DRCGain_0x0300 |
| | 0x0301 | Conversational Video 48K | DRCGain_0x0301 |
| | 0x0302 | Conversational Video 56K | DRCGain_0x0302 |
| | 0x0303 | Conversation Video 64K | DRCGain_0x0303 |
| Conversation Media Control Signaling | 0x0500 | Conversational Media Control Signaling | DRCGain_0x0500 |

As shown, the service categories include conversational speech, conversational video and conversational media control signaling. Furthermore, a given service category may include varying levels of services. In the example of Table 1, conversational video includes four possible speeds. Each is treated as a different service as shown in Table 1, and each includes a different profile identifier and a DRC channel power gain associated therewith. While Table 1 uses the DRC channel as an example channel for basing decisions on the reverse link overhead channel power gain, it will be understood that other reverse link channels may be used. As will be appreciated, the Profile ID information of Table 1 is conveyed from the access terminal to the access network during the initial configuration and is received as part of the service capabilities of the access terminal in step S10. Returning to step S14, the access network will examine the Profile ID information such as provided in Table 1, and choose the highest gain listed in that table as the overhead channel power gain for the access terminal during the initial configuration. This default value is communicated from the access network to the access terminal during the initial configuration.

Returning to step S12, if the access network does have a service activity history for the access terminal, then processing proceeds from step S12 to step S16. In step S16, the access network determines the most likely service that the access terminal will activate. This may be simply done by identifying the service with the largest number of service activations or service instances. The access network then sets the initial or default power gain equal to that of the service most likely activated by the access terminal as determined from the service history. If two or more possible services have the largest and same activity (e.g., number of service activations or instances), then the access network sets the overhead channel power gain to that of the service having the largest overhead channel power gain.

Next, an embodiment of the method for adapting the overhead channel power gain as a result of a service activation will be described with respect to FIG. 4. As shown, in response to a service activation, the access network determines if the current overhead channel power gain for the access terminal is set at the maximum possible overhead channel power gain for all supported services in step S20. For example, with respect to Table 1, the access network will determine if the current overhead channel power gain equals the maximum DRC channel power gain set forth in Table 1. If, in step S20, the current gain is set to the maximum gain of the supportable services, then processing proceeds to step S22.

In step S22, the access network determines if the system is loaded. According to one embodiment of the present invention, the access network determines the total received power at the access network. If this total received power is greater than a threshold amount, then the access network determines that the system is loaded. If the system is not loaded, then the access network does nothing. Namely, because the system is not loaded, the access network can continue to receive the overhead channels while transmitted at their maximum overhead channel power gain.

However, if the system is loaded, then processing proceeds from step S22 to step S24. Also, in step S20, if the current gain is not set to the maximum gain of the supported services, then processing proceeds to step S24. In step S24, the access network determines the maximum of the gains of the activated services including the most recently requested service.

Then, in step S26, the access network determines if the gain determined in step S24 is different from the current gain used by the access terminal. If so, then in step S28, the access network sends a channel power update request indicating the gain determined in step S24. However, if the access network determines no difference in step S26, then nothing is done.

As will be appreciated, if the access terminal's overhead channel power gain was set without the benefit of the access terminal's service activity history, the overhead channel power gain will be set to a maximum for the supportable services, regardless of which service is then subsequently requested for activation. The embodiment of FIG. 4 allows the gain to be changed; namely, reduced to the gain associated with the service subsequently requested activity. Similarly, if the gain set based on the access terminal's service history does not match the gain for the service eventually requested, then the embodiment of FIG. 4 also permits an adjustment.

Next, an embodiment of the method for adapting the overhead channel power gain on the reverse link as a result of a service deactivation will be described with respect to the flowchart illustrated in FIG. 5. As shown, in response to a service deactivation, the access network determines if the access network is loaded in step S40. This determination may be performed in the same manner as described above with respect to step S22. If the system is not loaded, then no changes are made. However, if the system is loaded, then in step S42, the access network determines if the access terminal has any remaining active services. If so, then in step S44, the access network determines the maximum gain associated with the remaining active services. Then, in step S46, the access network determines if the gain determined in step S44 differs from the current gain used by the access terminal. If so, then in step S48, the access network sends a channel power update request to the access terminal providing the gain value determined in step S44. If no difference is determined in step S46, then nothing is done.

Figure 3:
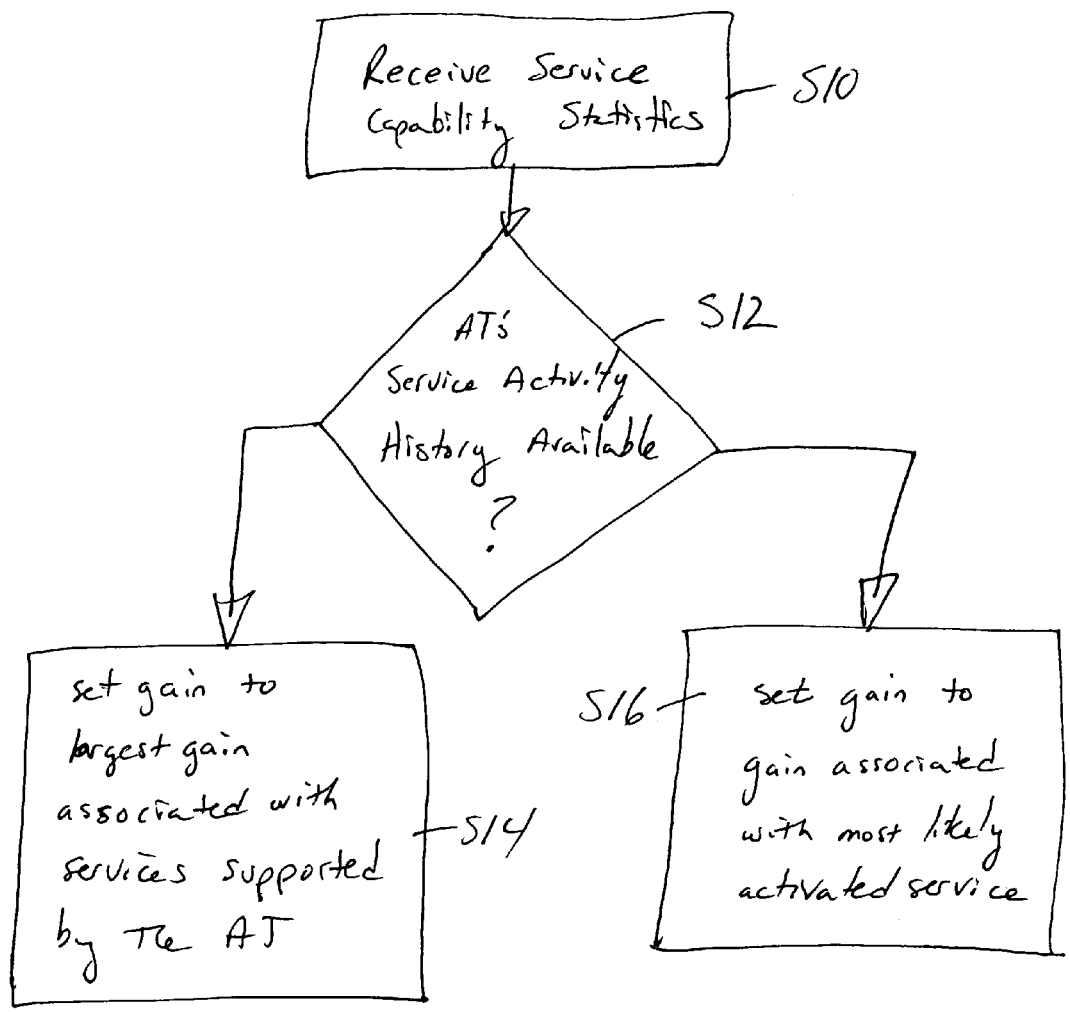
FIG. 3 illustrates a method according to the present invention for establishing a default reverse link overhead channel power gain.

Returning to step S42, if no services remain active, then in step S50, the methodology of FIG. 3 is invoked to determine a default gain value. Processing then proceeds to step S52. The access network in step S52 determines whether or not the gain value determined in step S50 is different from the current gain value used by the access terminal. If so, then in step S48, the access network sends a channel power update request to the access terminal providing the gain value determined in step S50. If no difference is determined in step S52, then nothing is done As demonstrated above, if the access network is not loaded, then, even in the event of service deactivation, sufficient resources exist to allow the access terminal to continue transmitting at its present overhead channel power gain. However, if the system is loaded, then based on the remaining services that are active, the overhead channel power gain may be adapted.

It will be appreciated that the various embodiments of the present invention provide for setting and adapting the overhead channel power gain on the reverse link such that the most beneficial tradeoff between better reverse link overhead channel feedback and overall system capacity is achieved.

The invention being thus described, it will be obvious that the same may be varied in many ways. For example, while the embodiments of the present invention have been described with respect to the reverse link overhead channels for cdma 2000 1x-EV-DO, the present invention is not limited to this cdma 200 standard or to cdma standards. Furthermore, it will be appreciated that the embodiments of the present invention may be used independently of one another. For example, the embodiment of FIG. 3 does not need to be performed in conjunction with the embodiments of FIGS. 4 and 5, the embodiment at FIG. 4 does not need to be performed in conjunction with the embodiments of FIGS. 3 and 5, and the embodiment of FIG. 5 does not need to be performed in conjunction with the embodiments of FIGS. 3 and 4. Such variations are not to be regarded as a departure from the invention, and all such modifications are intended to be included within the scope of the invention.

We claim:

1. A method of reverse link overhead channel power gain control, comprising:
    determining a reverse link overhead channel power gain for an access terminal based on a record of previous communication service activations for a plurality of communication service formats for the access terminal;
    determining whether the access network is loaded in response to one of a communication service activation and a communication service deactivation for the access terminal;
    determining whether to change the reverse link overhead channel power gain for the access terminal based on whether the access network is loaded and the one of the communication service activation and the communication service deactivation; and
    sending a new reverse link overhead channel power gain to the access terminal if the determining whether to change step determines to change the reverse link overhead channel power gain.

2. The method of claim 1, wherein the determining a reverse link overhead channel power gainstep comprises:
    determining which communication service of the plurality of communication service formats has been activated a most number of times based on the record of previous communication service activations for the plurality of communication service formats; and
    setting the reverse link overhead channel power gain based on a power gain associated with the determined communication service.

3. The method of claim 2, further comprising:
    receiving communication service capability information from the access terminal, the communication service capability information indicating communication services supported by the access terminal and a power gain associated with each communication service.

4. The method of claim 1, further comprising:
sending the determined reverse link overhead channel power gain to the access terminal.

5. The method of claim 1, wherein the determining whether to change step comprises:
determining a largest gain associated with active communication services of the access terminal if the access network is loaded; and
determining to change the reverse link overhead channel power gain for the access terminal if the determined largest gain is different from a current reverse link overhead channel power gain.

6. The method of claim 5, wherein the sending step sends the determined largest gain as the new reverse link overhead channel power gain.

7. The method of claim 5, wherein if the communication service activation has occurred, further comprising:
determining if the current reverse link overhead channel power gain is equal to a highest gain associated with communication services supported by the access terminal; and
performing the determining whether to change step regardless of whether the system is loaded if the current reverse link overhead channel power gain is equal to the highest gain.

8. The method of claim 7, further comprising:
Receiving communication service capability information from the access terminal, the communication service capability information indicating communication services supported by the access terminal and a power gain associated with each communication service.

9. The method of claim 5, further comprising:
receiving communication service capability information from the access terminal, the communication service capability information indicating communication services supported by the access terminal and a power gain associated with each communication service.

10. The method of claim 1, if the communication service activation has occurred, further comprising:
determining if a current reverse link overhead channel power gain is equal to a highest gain associated with communication services supported by the access terminal; and
performing the determining whether to change step regardless of whether the system is loaded if the current reverse link overhead channel power gain is equal to the highest gain.

11. The method of claim 1, if the communication service deactivation has occurred, further comprising:
determining if any communication services remain active if the access network is loaded; and
performing the determining whether to change step if the determining if any communication service remain active step determines that at least one communication service is active.

12. The method of claim 11, wherein the determining whether to change step comprises:
determining a largest gain associated with active communication services of the access terminal if the access network is loaded; and
determining to change the reverse link overhead channel power gain for the access terminal if the determined largest gain is different from a current reverse link overhead channel power gain.

13. The method of claim 11, if the communication service deactivation has occurred and if the access network is loaded, the determining whether to change step comprises:
determining a possible reverse link overhead channel power gain based on the record of previous communication service activations for the access terminal if the record of previous communication service activations is available; and
determining the possible reverse link overhead channel power gain based on a highest gain for communication services supported by the access terminal if the record of previous communication service activation is unavailable; and
determining to change the reverse link overhead channel power gain if the determined possible link overhead channel power gain is different from a current reverse link overhead channel power gain.

14. The method of claim 13, wherein the sending step sends the determined possible link overhead channel power gain as the new reverse link overhead channel power gain if the determined to change step determines to change the reverse link overhead channel power gain.

15. The method of claim 13, wherein the determining a possible reverse link overhead channel power gain based on the record of previous communication service activations step comprises:
determining which communication service has been activated a most number of times based on the record of previous communication service activations; and
setting the possible reverse link overhead channel power gain based on a power gain associated with the determined communication service.

16. A method of reverse link overhead channel power gain control, comprising:
performing a default reverse link overhead channel power gain determination methodology during an initial configuration between an access network and an access terminal, the methodology determining a default reverse link overhead channel power gain based on an availability of a record of previous communication service activations for a plurality of communication service formats for the access terminal;
performing a first adaptive reverse link overhead channel power gain determination methodology if a communication service activation has occurred; and
performing a second adaptive reverse link overhead channel power gain determination methodology if a communication service deactivation has occurred, the second adaptive reverse link overhead channel power gain determination methodology being different than the first adaptive reverse link overhead channel power gain determination methodology;
determining whether the access network is loaded in response to one of the communication service activation and a communication service deactivation for the access terminal;
determining whether to change the reverse link overhead channel power gain for the access terminal based on whether the access network is loaded and the one of the communication service activation and the communication service deactivation; and
sending a new reverse link overhead channel power gain to the access terminal if the determining whether to change step determines to change the reverse link overhead channel power gain.

* * * * *